(12) United States Patent
Hayashi

(10) Patent No.: US 7,721,987 B2
(45) Date of Patent: May 25, 2010

(54) ROLLER CLUTCH

(75) Inventor: Kentaro Hayashi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/202,340

(22) Filed: Sep. 1, 2008

(65) Prior Publication Data
US 2009/0057461 A1    Mar. 5, 2009

(30) Foreign Application Priority Data
Sep. 5, 2007    (JP)    ............. 2007-230527

(51) Int. Cl.
*A01K 89/01*    (2006.01)
(52) U.S. Cl. ............. 242/262; 242/295; 192/45; 192/41 S; 192/41 A
(58) Field of Classification Search ................ 242/257, 242/262, 295, 301; 192/45, 41 S, 41 A
See application file for complete search history.

(56) References Cited

U.S. PATENT DOCUMENTS

| | | | | | |
|---|---|---|---|---|---|
| 4,549,638 | A | * | 10/1985 | Johnston | 192/45 |
| 4,828,086 | A | * | 5/1989 | Lederman | 192/45 |
| 4,850,463 | A | * | 7/1989 | Lederman | 192/45 |
| 4,893,702 | A | * | 1/1990 | Lederman | 192/45 |
| 5,176,232 | A | * | 1/1993 | Malecha | 192/45 |
| 5,279,400 | A | * | 1/1994 | Riggle et al. | 192/45 |
| 5,595,272 | A | * | 1/1997 | Zhou | 192/45 |
| 6,830,137 | B2 | * | 12/2004 | Fujiwara | 192/45 |
| 6,997,295 | B2 | * | 2/2006 | Pederson et al. | 192/41 A |
| 7,147,091 | B2 | * | 12/2006 | Iga et al. | 192/45 |

FOREIGN PATENT DOCUMENTS

| | | |
|---|---|---|
| FR | 1 504 748 A | 2/1968 |
| JP | 2001-25338 A | 1/2001 |
| JP | 2002-335826 A | 11/2002 |

* cited by examiner

*Primary Examiner*—Emmanuel M Marcelo
(74) *Attorney, Agent, or Firm*—Global IP Counselors, LLP

(57) ABSTRACT

A roller clutch arranged to transmit rotation in only one direction includes an outer ring, an inner ring, a plurality of rollers, a retainer, a cam surface, and a plurality of spring members. The inner ring is disposed on the inner peripheral surface of the outer ring. The rollers are disposed between the inner ring and the outer ring in a circumferential direction and are allowed to frictionally engage the outer and inner rings. The retainer includes a plurality of holding portions disposed among the rollers, and shaft portions that protrude from the holding portions toward the rollers. The cam surface is an oblique surface on the inner peripheral surface of the outer ring and arranged to contact the outer peripheral surface of the rollers. The spring members are disposed on the outer peripheral side of the shaft portions and urge the rollers to frictionally engage the cam surface.

18 Claims, 7 Drawing Sheets

ROLLER CLUTCH

CROSS-REFERENCE TO RELATED APPLICATIONS

This application claims priority under 35 U.S.C. §119 to Japanese Patent Application No. 2007-230527 filed on Sep. 5, 2007. The entire disclosure of Japanese Patent Application No. 2007-230527 is hereby incorporated herein by reference.

BACKGROUND OF THE INVENTION

1. Field of the Invention

The present invention generally relates to a roller clutch. More specifically, the present invention relates to a clutch that is configured to transmit rotation in only one direction.

2. Background Information

A fishing reel, particularly a spinning reel, is provided with an anti-reverse rotation mechanism for preventing a rotor from reversing in a line-releasing direction during casting or line-winding. The anti-reverse rotation mechanism is constructed of a one-way clutch that is disposed between a reel unit and a rotor. Conventionally, a roller clutch is adopted for reducing the play (or clearance) produced during reverse rotation and is commonly known as an anti-reverse rotation one-way clutch.

In general, a roller clutch includes an outer ring, an inner ring, and a plurality of rollers. The inner ring is allowed to rotate relative to the outer ring. The rollers are disposed between the outer ring and the inner ring and are allowed to frictionally engage both of the rings while being interposed there between.

Also, the roller clutch generally comes in two forms: the inner ring idling type and the outer ring idling type. With respect to the outer ring idling type, a cam surface is formed on the outer peripheral surface of the inner ring. With respect to the inner ring idling type, a cam surface is formed on the inner peripheral surface of the outer ring. The roller clutch of this type is provided with a retainer for disposing rollers at predetermined intervals in a circumferential direction (see Japanese Patent Laid-Open Publication No. 2001-25338).

According to conventional practice, a retainer in the inner ring idling type roller clutch includes a washer shaped attachment portion, a part of which is disposed on an end portion of an outer ring, and a plurality of holding portions that protrude from one surface of the attachment portion on the inner peripheral side. Accordingly, the attachment portion is disposed not only on the outer peripheral side of the holding portions but also among the holding portions. The holding portions are disposed among a plurality of rollers, and respectively include a curved surface on one surface in a circumferential direction. The curved surface is configured to engage with the outer peripheral surface of each of the rollers. In addition, the holding portions respectively include a recessed portion for accommodating a spring member on the other surface in the circumferential direction. The spring member is constructed of a coil spring for urging the rollers in a direction that the rollers frictionally engage a cam surface. The recessed portion is constructed to be opened and have a circular shape on the other surface in the circumferential direction so that the roller is allowed to be urged in the direction that the rollers frictionally engage the cam surface.

According to the conventional configuration in which a recessed portion is formed in a holding portion and a spring member composed of a coil spring is accommodated in the recessed portion, the outer diameter of the coil spring is restricted to be equal to or less than the inner diameter of the recessed portion. Because of this, when the holding portion is designed to have a small size, the recessed portion is accordingly constructed to have a small size. Therefore, the outer diameter of the spring member must be formed to have a small size. When the outer diameter of the spring member is formed to have a small size, it will be difficult for the recessed portion to hold the spring member. For example, an operation of embedding the spring member into the recessed portion by picking the spring member with tweezers will be difficult.

SUMMARY OF THE INVENTION

Accordingly, aspects of the present invention have been created to solve the above-mentioned problems occurring in the conventional practice, and to make it easy to form a retainer having a small size in a roller clutch, and to make it easy to perform an embedding operation of a spring member even when the retainer is formed in a small size in a roller clutch.

A roller clutch according to an aspect of the present invention is a clutch that is capable of transmitting rotation in only one direction, and includes an outer ring, an inner ring, a plurality of rollers, a retainer, a cam surface, and a spring member. The outer ring has an inner peripheral surface. The inner ring has an outer peripheral surface and is disposed on the inner peripheral side of the outer ring. The plurality of rollers are disposed between the inner ring and the outer ring at predetermined intervals in a circumferential direction and are allowed to frictionally engage the outer ring and the inner ring while being interposed there between. The retainer includes a plurality of holding portions and a plurality of shaft portions. The plurality of holding portions are disposed among the plurality of rollers, and the plurality of shaft portions protrude from the plurality of holding portions toward the plurality of rollers. The cam surface is formed either on the outer peripheral surface or the inner peripheral surface. The cam surface is an oblique surface that is allowed to contact the outer peripheral surface of the roller. The spring member is a coil spring disposed on the outer peripheral side of the shaft portion. The spring member is configured to urge the plurality of rollers in a direction such that the rollers frictionally engage the cam surface.

With respect to the roller clutch, when the inner ring and the outer ring rotate relative one to the other, the plurality of rollers are urged by the spring member to frictionally engage the cam surface and rotation is transmitted thereby. Also, when the inner ring and the outer ring rotate in a direction that the rollers are separated away from the cam surface, the rollers are separated away from the cam surface so as to counterwork the urging force applied by the spring member, and thus a rotation blocking condition is produced. Here, the spring member for urging the rollers is disposed on the outer peripheral side of the shaft portion. Therefore, the inner diameter of the coil spring is restricted by the outer diameter of the shaft portion. However, the outer diameter of the coil spring is not restricted by the shaft portion. Accordingly, even when the holding portions are formed to have a small size, it is possible to form the outer diameter of the spring member to have a larger size than a conventional spring member that is configured to be accommodated in the conventional recessed portion, and thus a fitting operation of the spring member will be easily performed.

A roller clutch according to another aspect of the present invention wherein the retainer further includes a washer-shaped plate attachment portion, and the holding portions protrude from an inner peripheral part of the attachment portion to the inner peripheral side, and the shaft portions are formed integral with the holding portions. In this case, the holding portions protrude from the inner peripheral part of the attachment portion toward the inner peripheral side. Therefore, even when the shaft portions are formed integral with the holding portions, it is possible to mold the shaft portions without interference with the attachment portion by dividing the die in the center of the shaft portion in contacting/separating directions with/from one surface of the attachment portion. Accordingly, it is possible to easily form the retainer by die forming. Also, the attachment portion is not provided among the holding portions, and the shaft portions are formed instead of forming a conventional recessed portion for attaching the spring member thereto.

A roller clutch according to another aspect of the present invention wherein each of the shaft portions includes a protruding portion, which is allowed to contact an inner peripheral part of the spring member, at least on a part of its outer peripheral surface. In this case, it is possible to make the outer peripheral surface of the protruding portion contact with the inner peripheral part of the coil spring. Therefore, it is possible to prevent the spring member from coming off the shaft portion.

A roller clutch according to another aspect of the present invention wherein each of the shaft portions includes a pair of cutout surfaces on its outer peripheral surface. The pair of cutout surfaces are disposed substantially parallel to axes of the roller and parallel to each other. In this case, when the die is divided in the center of the shaft portion and burrs are created in the divided portions, a gap between the shaft portions and the spring member is maintained by the pair of cutout surfaces. Therefore, fitting of the spring member onto the shaft portions is not easily influenced by the burrs, and it is possible to easily place the spring member onto the shaft portion.

A roller clutch according to another aspect of the present invention wherein the cam surface is disposed on the inner peripheral surface of the outer ring, and the attachment portion is mounted on an end surface of the outer ring. In this case, it is possible to hold the retainer in the inner ring idling type roller clutch with use of the A roller clutch according to another aspect of the present invention wherein the roller clutch further includes a closed-end tubular casing member that is secured to a reel unit for a fishing reel and has an interior space for accommodating the outer ring and the retainer, and the attachment portion is disposed between the outer ring and a bottom portion of the casing member. In this case, it is possible to hold the retainer at the bottom portion of the casing member.

A roller clutch according to another aspect of the present invention wherein each of the holding portions include the shaft portion on one surface thereof in a circumferential direction. The holding portions include a curved contact surface that is allowed to contact the outer peripheral surface of the rollers on the other surface thereof. In this case, the roller, which is urged by the spring member mounted to the shaft portion provided on one of the holding portions, is stably held on the curved contact surface of the adjacent holding portion.

According to the present invention, the spring member for urging the roller is disposed on the outer peripheral side of the shaft portion. Therefore, the inner diameter of the coil spring is restricted by the outer diameter of the shaft portion, but the outer diameter of the coil spring is not restricted by the shaft portion. Accordingly, even when the holding portion is formed to have a small size, it is possible to form the outer diameter of the spring member to have a larger size than a conventional spring member that is accommodated in a recessed portion, and a fitting operation of the spring member will be easily performed.

These features, aspects and advantages of the present invention will become apparent to those skilled in the art from the following detailed description, which, taken in conjunction with the annexed drawings, disclose example embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
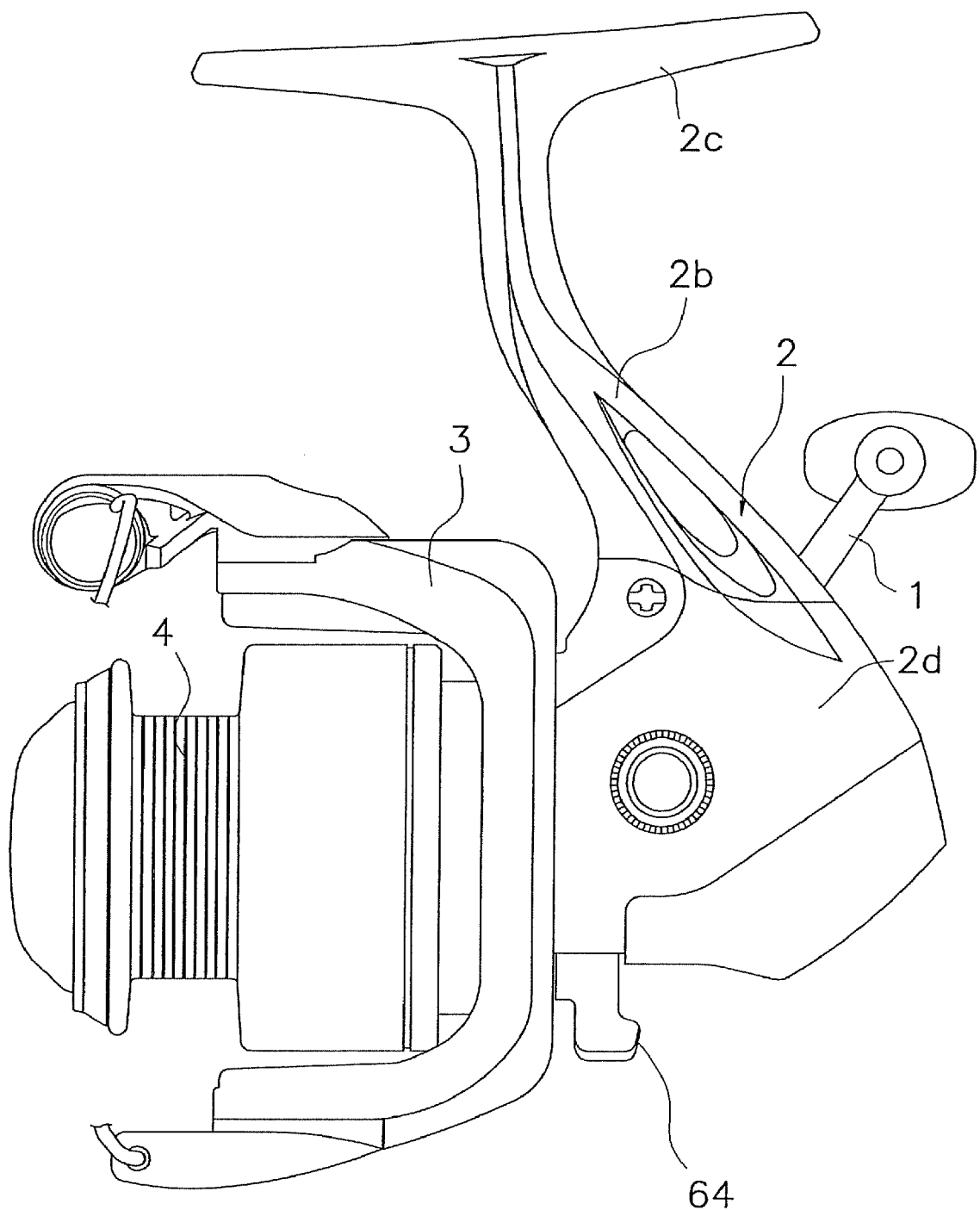
FIG. 1 is a lateral view of a spinning reel to which an embodiment of the present invention is applied.

In FIG. 1, a spinning reel to which an embodiment of the present invention is applied is a front drag type reel for winding a fishing line around an axis X (FIG. 2) along the longitudinal direction of a fishing rod. The spinning reel includes a reel unit 2 that is provided with a handle 1, a rotor 3 that is rotatably supported at the front of the reel unit 2, and a spool 4 that is disposed at the front of the rotor 3 and serves to rewind the fishing line.

Figure 2:
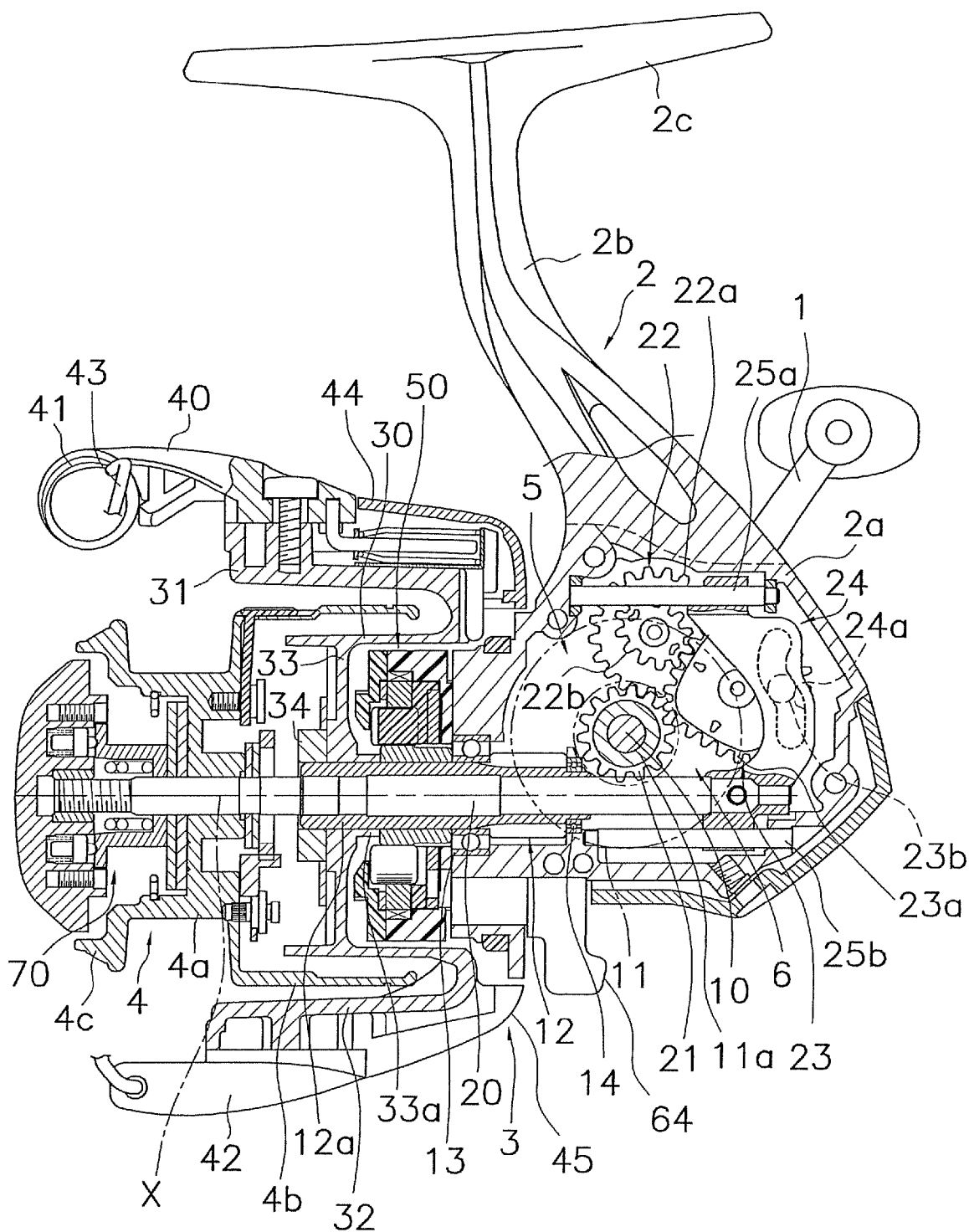
FIG. 2 is a lateral cross-sectional view of the spinning reel.
Figure 3:
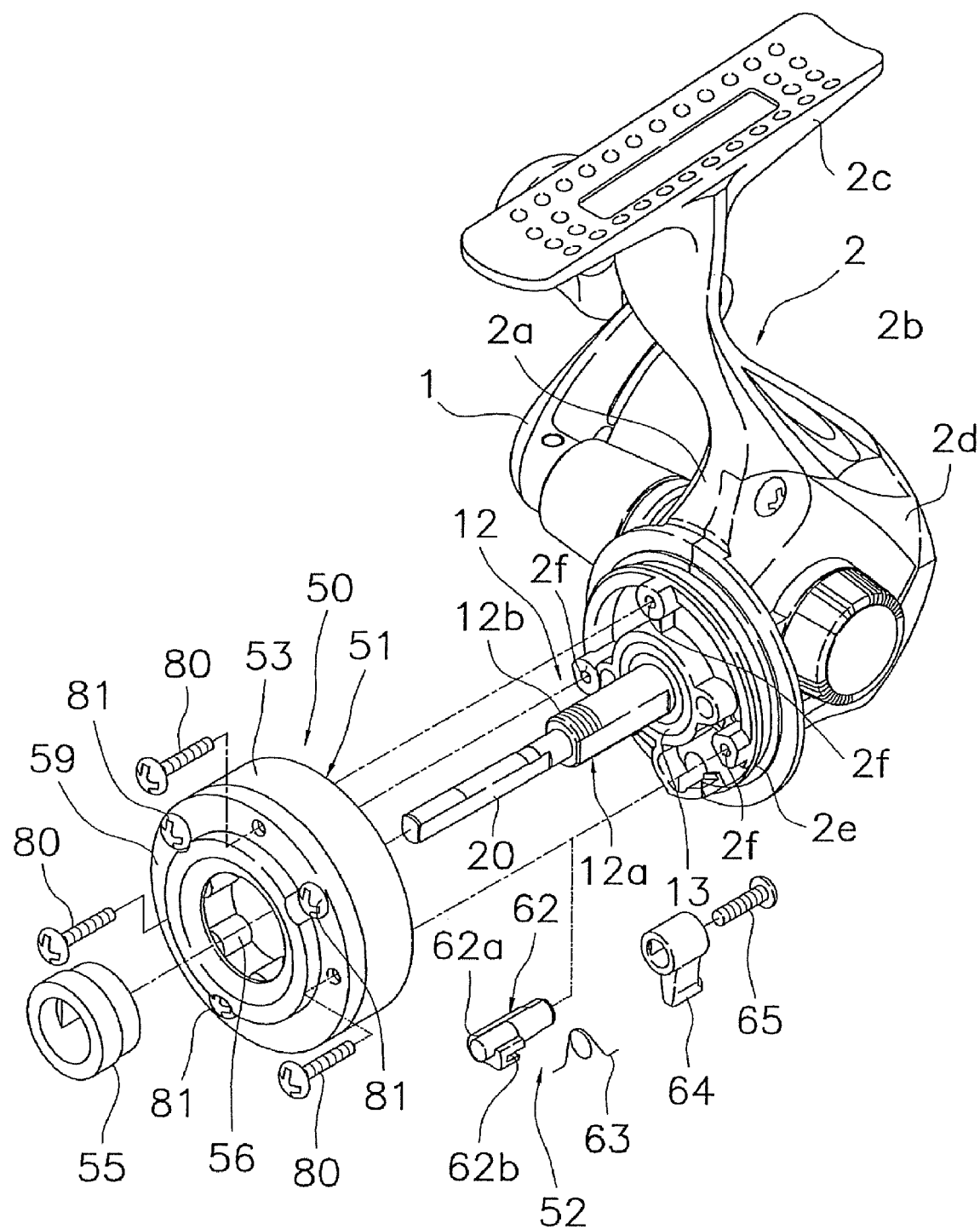
FIG. 3 is a perspective view illustrating a condition of the spinning reel to which an anti-reverse rotation mechanism is attached.
Figure 4:
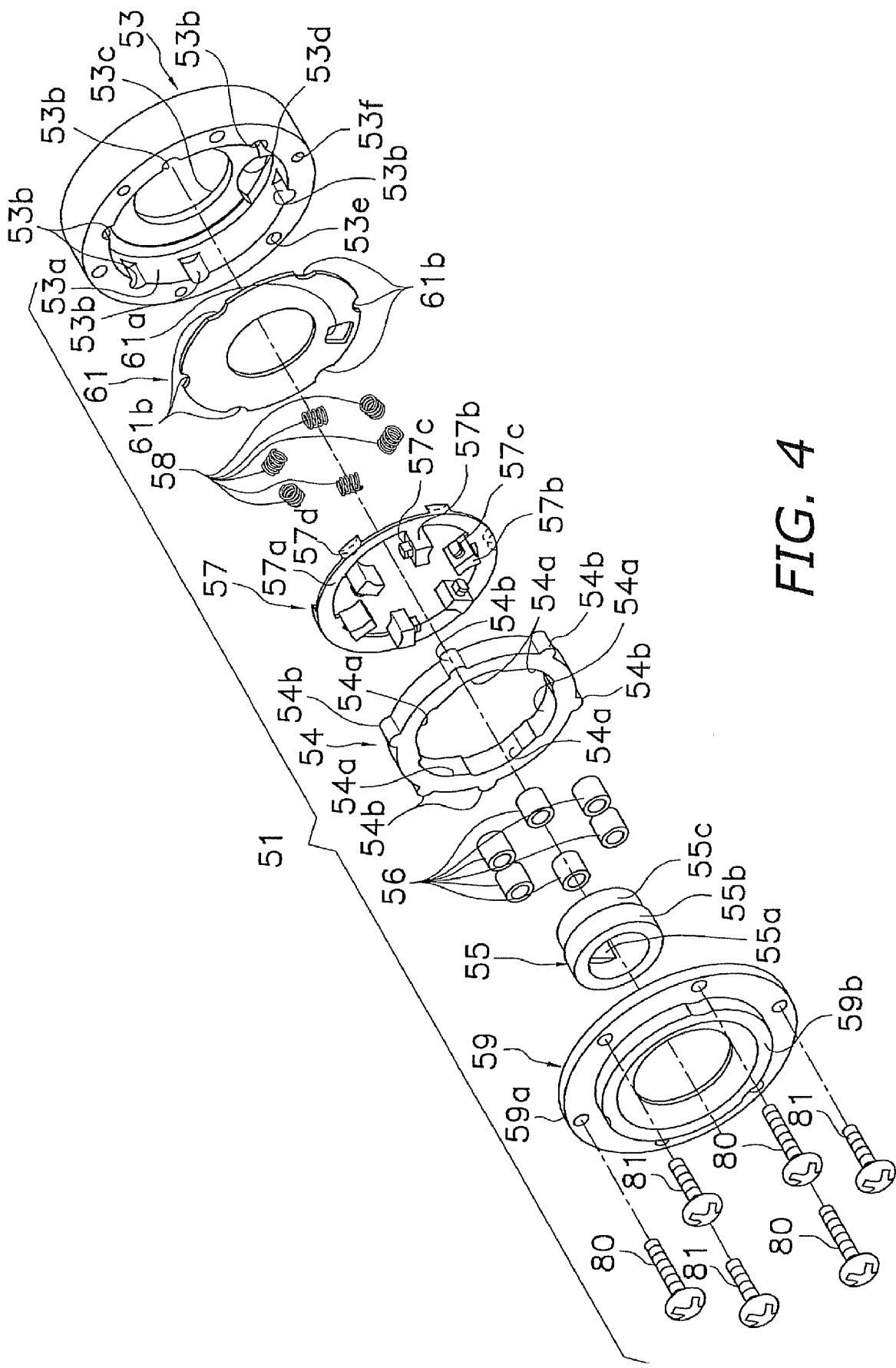
FIG. 4 is an exploded perspective view of a roller clutch.

The reel unit 2 can be made of metal or synthetic resin. As illustrated in FIGS. 1 and 2, the reel unit 2 includes an antero-posteriorly elongated mounting portion 2c that is mounted to the fishing rod, a reel body 2a that is disposed away from the mounting portion 2c (FIG. 2), and a leg portion 2b that couples the mounting portion 2c with the reel body 2a. The reel body 2a includes an interior space for accommodating mechanical parts of the spinning reel. The reel body 2a also includes a lateral portion that is formed to be opened. The opening in the lateral portion of the reel body 2a is covered with a lid member 2d (FIGS. 2 and 3).

A rotor driving mechanism 5 for rotating the rotor 3 and an oscillating mechanism 6 for reciprocating the spool 4 back and forth in conjunction with rotation of the handle 1 are provided in the interior space of the reel body 2a. As illustrated in FIG. 3, a circular-shaped mechanism attachment portion 2e for mounting an anti-reverse rotation mechanism 50 (to be described) thereon is formed on the front part of the reel body 2a. Three threaded holes 2f are formed in the mechanism attachment portion 2e and are arranged at equal intervals in the circumferential direction.

The rotor drive mechanism 5 includes a master gear 11 and a pinion gear 12. Here, the master gear 11 is a face gear and has a master gear shaft 11a that is configured to rotate with a handle shaft 10 to which the handle 1 is coupled, and the pinion gear 12 meshes with the master gear 11. The pinion gear 12 generally has a tubular shape. A front portion 12a of the pinion gear 12 penetrates the center part of the rotor 3 and extends along the rotation axis X toward the spool 4. In addition, a male threaded portion 12b (FIG. 3) is formed on the front portion 12a. The intermediate portion and the rear end portion of the pinion gear 12 in the axial direction are rotatably supported by the reel body 2a through a bearing 13 and a bearing 14, respectively.

The oscillation mechanism 6 includes a driving gear 21 that is provided in the master gear shaft 11a, an intermediate gear part 22 that meshes with the driving gear 21, a cam gear part 23 that rotates in conjunction with the driving gear 21 through the intermediate gear part 22, a slider part 24 that is non-rotatably and non-movably secured to the rear end of a spool shaft 20 and engages with the cam gear part 23 and accordingly moves back and forth, and two guide shafts 25a and 25b that are provided in the reel body 2a and guides the slider part 24 for allowing the slider part 24 to move back and forth. The driving gear 21 is a circular gear and is disposed in the master gear shaft 11a so as to be separated from the master gear 11. The intermediate gear part 22 is a disk shaped member and is mounted to the reel body 2a so as to be allowed to rotate around an axis parallel to the master gear shaft 11a. The intermediate gear part 22 includes a first gear 22a that meshes with the driving gear 21, and a second gear 22b that is coaxially disposed with the first gear 22a. The number of teeth of the first gear 22a is more than that of the driving gear 21, and the first gear 22a is, for example, a circular gear with 22 teeth such as a spur gear or a helical gear. The second gear 22b comprises, for example, a non-circular gear with twelve teeth such as an elliptic gear with two semi-major axes. The cam gear part 23 is a disk shaped member and is mounted to the reel body 2a so as to be allowed to rotate around an axis parallel to the intermediate gear part 22. The cam gear part 23 includes a gear portion 23a and a columnar shaped cam pin 23b. The gear portion 23a is formed on the outer peripheral part of the cam gear part 23. The columnar shaped cam pin 23b is provided so as to protrude in a direction axially parallel to the master gear shaft 11a.

The gear portion 23a is a non-circular gear with four semi-major axes, which has more teeth (e.g., twenty-four teeth) than the second gear 22b. The gear part 23a is arranged so that teeth of the gear part 23a, which forms the maximum diameter thereof, meshes with the teeth of the second gear 22b, which forms the maximum diameter of the second gear 22b. The rear end of the spool shaft 20 is secured to the slider part 24. The slider part 24 includes a cam receiving portion 24a configured to engage with the cam pin 23b. In particular, the cam receiving portion 24a includes a penetrating groove for receiving the cam pin 23b. The slider part 24 is supported by the reel body 2a through the guide shafts 25a and 25b so as to be allowed to reciprocate back and forth.

The two guide shafts 25a and 25b are parallel and disposed one above the other in the reel body 2a at a predetermined space. The two guide shafts 25a and 25b are arranged to guide the slider part 24 in the anteroposterior direction along the spool shaft 20.

The rotor 3 includes a cylindrical portion 30 and first and second arm portions 31 and 32 that are laterally disposed to the cylindrical portion 30 so as to be opposed to each other. The cylindrical portion 30 and both arm portions 31 and 32 are integrally formed.

A front wall 33 is formed in the front part of the cylindrical portion 30, and a boss portion 33a is formed in the center part of the front wall 33. A through hole is formed in the center part of the boss portion 33a, and the front portion 12a of the pinion gear 12 and the spool shaft 20 penetrate the through hole. A nut 34 is disposed on the front side of the front wall 33 and is screwed onto the tip threaded portion of the pinion gear 12.

A first bail support member 40 is pivotably mounted to the outer peripheral side of the tip of the first arm portion 31. A line roller 41 for guiding the fishing line to the spool 4 is mounted to the tip of the first bail support member 40. A second bail support member 42 is pivotably mounted to the outer peripheral side of the tip of the second arm portion 32. A bail 43 is provided between the line roller 41 mounted on the tip of the first bail support member 40 and the second bail support member 42. Also, covers 44 and 45 are attached on the outer peripheral side of the arm portions 31 and 32, respectively. Covers 44 and 45 are formed to have a smooth surface that continues in both the anteroposterior direction and in the circumferential direction. Accordingly, it is possible to prevent the fishing line from getting stuck with them.

The anti-reverse rotation mechanism 50 for the rotor 3 is disposed in an interior of the cylindrical portion 30 of the rotor 3. As illustrated in FIG. 3, the anti-reverse rotation mechanism 50 includes a roller clutch 51 according to an embodiment of the present invention and an operating mechanism 52 for switching the roller clutch 51 between an operating condition (rotation transmitting condition) and non-operating condition (rotation blocking condition).

As illustrated in FIGS. 3 to 6, the roller clutch 51 is an inner ring idling type roller clutch. The roller clutch 51 includes a casing member 53 that is secured to the mechanism attachment portion 2e of the reel body 2a, an outer ring 54 that is relatively non-rotatably mounted to the casing member 53, an inner ring 55 that is disposed on the inner peripheral side of the outer ring 54 and secured to the outer periphery of the front tubular portion of the pinion gear 12, a plurality of rollers 56, a retainer 57 for holding the plurality of rollers 56, a plurality of cam surfaces 54a that are formed on the inner peripheral surface of the outer ring 54, and a plurality of spring members 58. Each of the spring members 58, for example, can be a coil spring for urging each of the plurality of rollers 56 in a direction such that the rollers 56 frictionally engage the cam surfaces 54a. The roller clutch 51 also includes a cover member 59 that is secured to the casing member 53.

The casing member 53 is a closed-end tubular member that is made of synthetic resin and includes an interior space 53a for accommodating mechanical parts of the roller clutch 51. A plurality of interlocking grooves 53b (e.g., six) are formed on the inner peripheral surface of the interior space 53a of the casing member 53 at predetermined intervals. The interlocking grooves 53b are more or less semi-circular shaped recessed surfaces formed on the inner peripheral surface of the interior space 53a. The interlocking grooves 53b non-rotatably interlock with the outer ring 54. Only one of the interlocking grooves 53b is disposed to have unequal intervals with respect to adjacent grooves for the purpose of preventing erroneous assembling of the outer ring 54. A through hole 53c through which the inner ring 55 is allowed to pass is formed on the bottom portion of the casing member 53. A passing hole 53d through which an operating rod 62 (to be described) is allowed to pivot and pass is also formed on the bottom portion of the casing member 53 on the outer peripheral side of the through hole 53c. Also, a plurality of axially penetrated threaded through holes 53e (e.g., three) and a plurality of non-penetrated threaded holes 53f (e.g., three) are formed in the tubular portion of the casing member 53 at predetermined intervals in the circumferential direction. Fixing bolts 80 for securing the roller clutch 51 to the mechanism attachment portion 2e are inserted through the threaded through holes 53e, and fixing bolts 81 for securing the cover member 59 to the casing member 53 are screwed into the threaded holes 53f. The fixing bolts 80 are screwed into three threaded holes 2f (FIG. 3) formed in the mechanism attachment portion 2e.

A plurality of interlocking protrusions 54b arranged to be interlocked with the interlocking grooves 53b are formed on the outer peripheral surface of the outer ring 54 at predetermined intervals in the circumferential direction. Some of the interlocking protrusions 54b are disposed at uneven intervals. The above described cam surfaces 54a are recessed surfaces formed on the inner peripheral surface of the outer ring 54. The cam surfaces 54a are allowed to make contact with the outer peripheral surface of the rollers 56 and are made up of curved oblique surfaces so that the rollers 56 are allowed to frictionally engage the outer ring 54 and the inner ring 55. The number of the cam surfaces 54a corresponds to the number of the rollers 56 (e.g., six), and the cam surfaces 54a are formed at predetermined intervals in the circumferential direction.

The inner ring 55 is integrally-rotatably coupled to the front portion 12a of the pinion gear. An interlocking hole 55a to be engaged with the outer peripheral surface of the pinion gear 12 is formed on the inner peripheral surface of the inner ring 55. The interlocking hole 55a is not formed on the entire axial length of the inner ring 55 but on its rear part. A contact surface 55b that is allowed to make contact with the rollers 56, and a flank 55c that is disposed rearward of the contact surface 55b and is formed to have a diameter less than that of the contact surface 55b, are formed on the outer peripheral surface of the inner ring 55. The inner ring 55 is disposed to be interposed between the boss portion 33a of the rotor 3 and the inner ring of the bearing 13r.

The plurality of rollers 56 (e.g., six) are disposed between the outer ring 54 and the inner ring 55 at predetermined intervals in the circumferential direction. The rollers 56 are allowed to be in two different positions while disposed between both rings: a coupling position in which the rollers 56 frictionally engage both rings 54 and 55; and a non-coupling position in which the rollers 56 do not frictionally engage both rings 54 and 55. The rollers 56 are columnar rollers having a length within the range of 1-2 times the diameter thereof. The front ends of the rollers 56 are regulated by the cover member 59, and the rear ends of the rollers 56 are regulated by an operating plate 61 (to be described) of the operating mechanism 52.

Figure 5:
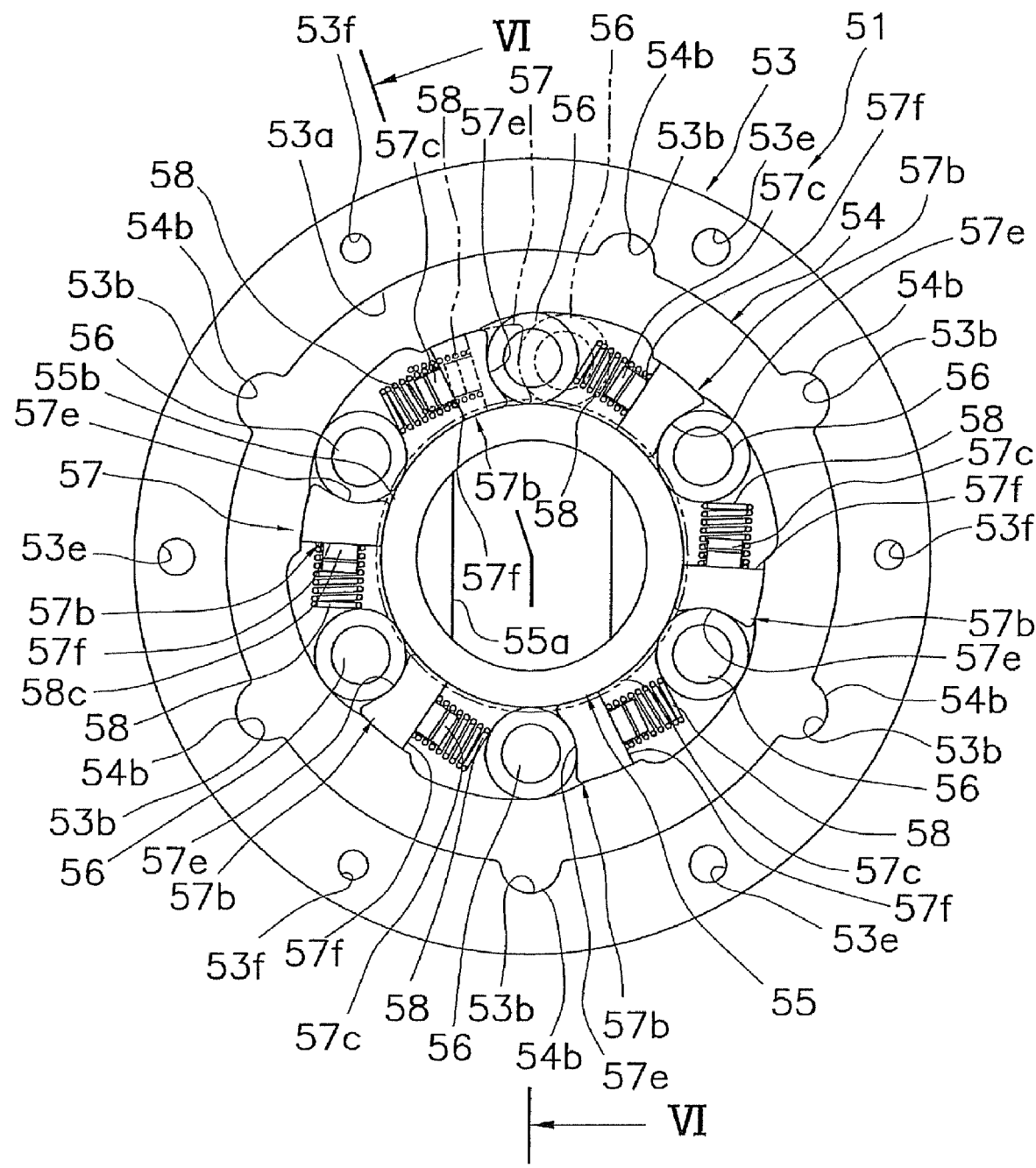
FIG. 5 is a front view of the roller clutch from which a cover member is removed.
Figure 6:
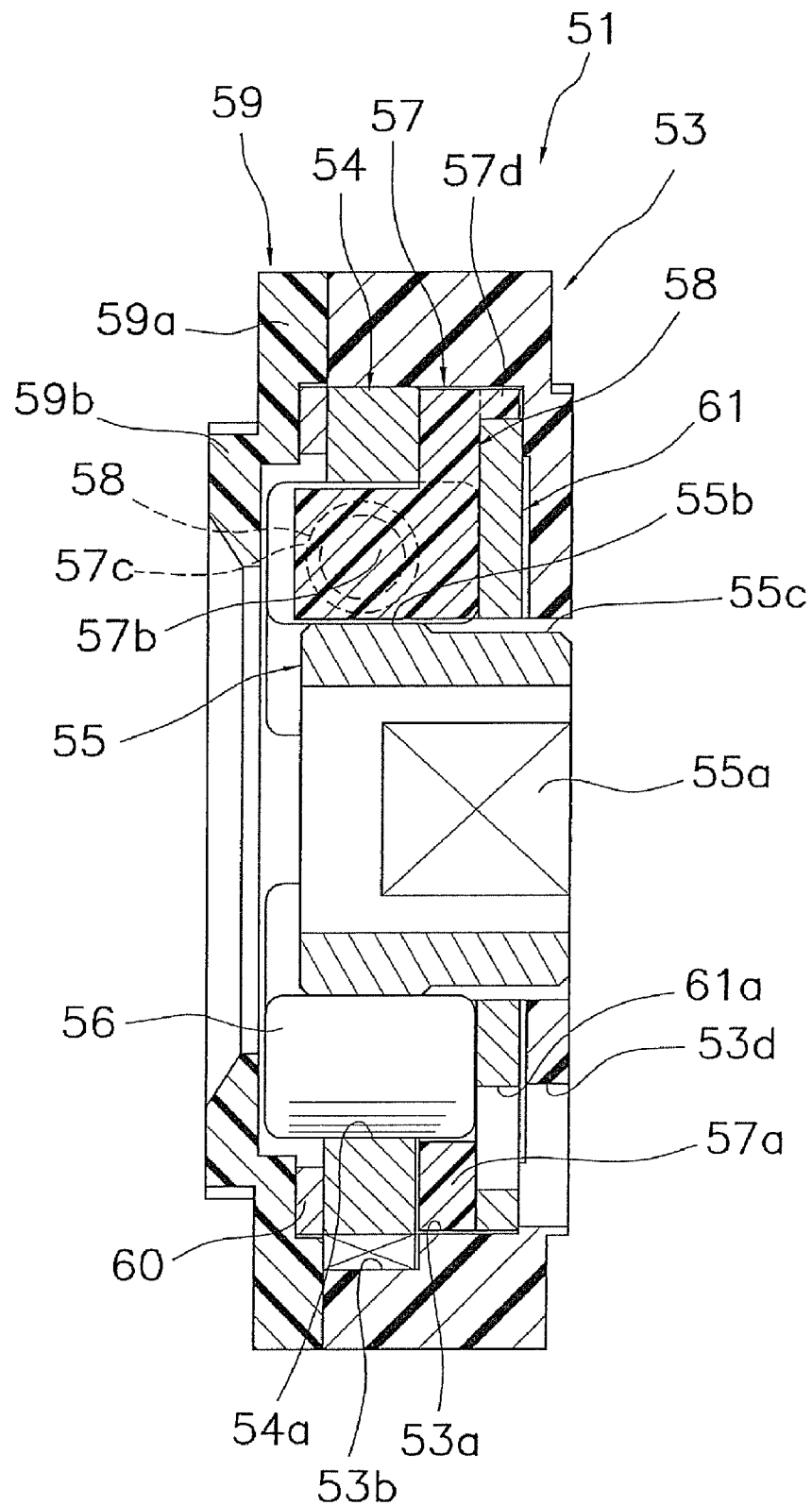
FIG. 6 is a cross-sectional view along line VI-VI in FIG. 5.

The retainer 57 is a molded product made of synthetic resin or the like and is accommodated in the interior space 53a of the casing member 53. The retainer 57 is provided for holding the rollers 56 at predetermined intervals in the circumferential direction. The retainer 57 also is provided for rotationally moving the rollers 56 to the coupling position in which the roller clutch 51 is in an activated state (illustrated with the solid line in FIG. 5) and to the non-coupling position in which the roller clutch 51 is in a non-activated state (illustrated with the two-dotted line in FIG. 5). In FIG. 5, note that only one of the plurality of rollers 56 set to be in the non-coupling position is illustrated for easy understanding of the diagram. The retainer 57 includes a washer shaped attachment portion 57a, a plurality of holding portions 57b (e.g., six) that are formed integral with the attachment portion 57a and protrude towards the inner peripheral side from the inner peripheral part of the attachment portion 57a, and a plurality of shaft portions 57c. Each of the plurality of shaft portions 57c is formed integral with each of the plurality of holding portions 57b.

The attachment portion 57a is disposed between the operating plate 61 (to be described) of the operating mechanism 52 and the rear surface of the outer ring 54. A plurality of interlocking protrusions 57d (e.g., six) for aligning the attachment phase of the attachment portion 57a with respect to the operating plate 61 are formed to protrude rearward (rightward in FIG. 4) from the outer peripheral part of the attachment portion 57a.

The plurality of holding portions 57b are disposed among the plurality of rollers 56 in such a way that the plurality of rollers 56 are positioned at predetermined intervals in the circumferential direction. The plurality of holding portions 57b are configured to move the plurality of rollers 56 together rotationally in the circumferential direction. The holding portions 57b are formed to protrude axially forward (leftward in FIG. 4) from the attachment portion 57a. Each of the holding portions 57b includes a curved contact surface 57e on one lateral surface in the circumferential direction. When the holding portions 57b are urged by the spring members 58, the curved contact surfaces 57e of the holding portions 57b are configured to make contact with the outer peripheral surface of the rollers 56.

As described above, with a configuration that the holding portions 57b are formed to protrude towards the inner peripheral side from the inert peripheral part of the attachment portion 57a, the attachment portion 57a does not overlap with the shaft portions 57c when the retainer 57 is molded with a die divided along the center axes of the shaft portions 57c. Accordingly, the attachment portion 57a does not work as an obstacle and molding will be easily performed even if the shaft portions 57c are provided in the holding portions 57b.

Figure 7:
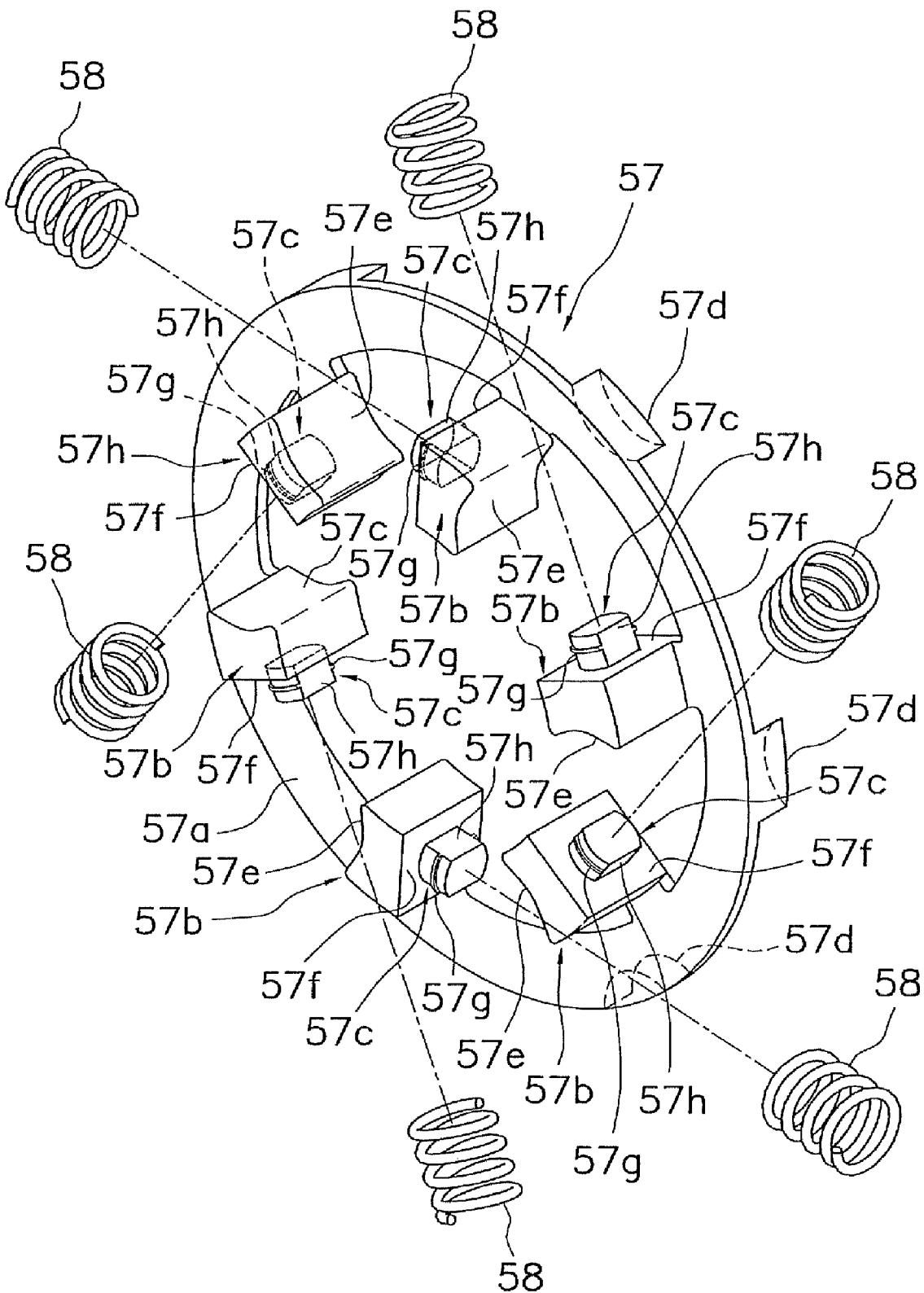
FIG. 7 is a perspective view of a retainer.

The plurality of shaft portions 57c protrude in a direction generally towards the rollers 56 from the other lateral surfaces 57f of the holding portions 57b in the circumferential direction. As illustrated in FIG. 7, the shaft portion 57c includes a protruding portion 57g on its outer peripheral surface. The protruding portion 57g is allowed to make contact with the spring member 58. The protruding height of the protruding portion 57g is, for instance, at least approximately 0.05 to 0.03 mm. Accordingly, the protruding portion 57g is allowed to make contact with the inner peripheral part of the coil. The protruding portion 57g is provided to prevent the spring member 58 from coming off while mounted onto the shaft portion 57c.

Suppose the outer peripheral surface of the entire shaft portion 57c is formed to make contact with the inner peripheral part of the coil; if so, the spring member 58 would not easily expand and contract. In response to this, the shaft portion 57c is configured such that only the protruding portion 57g makes contact with the inner peripheral part of the coil and the other parts of the shaft portion 57c do not. Because of this, the spring member 58 will easily expand and contract, and at the same time, not easily come off the shaft portion 57c.

Note that the size of the protruding portion 57g may be formed so that the protruding portion 57g is fixedly coupled within any of the gaps formed among parts of the coil. In such case, the spring member 58 may be fixedly coupled to the shaft portion 57c when the spring member 58 is rotated.

Also, the shaft portion 57c includes a pair of cutout surfaces 57h on its outer peripheral surface. The pair of cutout surfaces 57h are disposed substantially parallel to the shaft center of the roller 56 and are disposed parallel to each other. No protruding portion 57g is formed on the pair of cutout surfaces 57h. When the retainer 57 is molded with a die, the cutout surfaces 57h help to avoid the influence of burrs that tend to form on boundary parts of the retainer 57. When the pair of cutout surfaces 57h are not formed and burrs are generated, the spring member 58 will get stuck on the burrs and will not easily fit onto the shaft portion 57c. However, when the pair of cutout surfaces 57h are formed, a big gap is produced between the spring member 58 and the shaft portion 57c. Accordingly, even if burrs are generated, the spring member 58 will be easily fit onto the shaft portion 57c.

Note that in an actuated state in which the rollers 56 are positioned in the coupling position by the rotational movement of the retainer 57, the outer ring 54 and the inner ring 55 are allowed to rotate in only one direction. On the other hand, in a non-actuated state in which the rollers 56 are positioned in the non-coupling position, the outer ring 54 and the inner ring 55 are allowed to rotate.

As described above, the spring member 58 is formed in the form of a coil spring and is mounted on the outer peripheral surface of the shaft portion 57c. The spring member 58 is disposed in a compressed state so that tip of the coil presses the rollers 56 toward the outer ring 54.

Here, the spring member 58 is disposed on the outer peripheral side of the shaft portion 57c for urging the roller 56. Therefore, the inner diameter of the coil spring is restricted by the outer diameter of the shaft portion 57c, but the outer diameter of the coil spring is not restricted by the shaft portion 57c. Therefore, even when the holding portion 57b is formed into a small size, it is possible to form the spring member 58 to have an outer diameter greater than conventional spring member, which are usually accommodated in a conventional recessed portion as discussed earlier. Accordingly, a fitting operation of the spring member 58 will be easily performed.

Also, from the outside, it is easy to observe the shaft portion 57c to which the spring member 58 is mounted. Even when the holding portions 57b are formed to have a small size, a fitting operation of the spring member 58 onto the shaft portion 57c will be more easily performed than placing the conventional spring member in the recessed portion. The conventional spring member accommodated in the recessed portion is not easily observed from the outside because the recessed portion is formed to have one opened surface in the circumferential direction of the holding portion. In other words, the conventional recessed portion used to accommodate the conventional spring member encloses at least most of the outer peripheral surface of the conventional spring member.

In addition, the spring members 58 are allowed to urge the rollers 56 with high dimensional accuracy in a direction that the rollers 56 frictionally engage the cam surfaces 54a. When the rollers 56 are successfully urged toward the cam surface 54a with high dimensional accuracy, it is possible to reduce the rotation torque to be generated during rotation in the line-winding direction, and thereby the handle 1 will be smoothly rotated during winding of the fishing line.

The cover member 59 is a stepped disk shaped member that is made of synthetic resin and covers the interior space 53a of the casing member 53. The cover member 59 includes a fixing portion 59a and a roller regulating portion 59b. The fixing portion 59a is fixed to the casing member 53 and is formed to have large diameter. The roller regulating portion 59b is formed to protrude forward and have a diameter less than that of the fixing portion 59a.

The regulating portion 59b regulates the movement of the front end surface of the rollers 56. In addition, a regulation washer 60 is mounted to the inner surface of the fixing portion 59a. The regulation washer 60 is made of a lubricant-impregnated felt, for example, and makes contact with the front end surface of the outer ring 54 (FIG. 6) and thereby regulates movement of the outer ring 54.

The operating mechanism 52 includes the disk shaped operating plate 61, an operating rod 62, a toggle spring 63, and an operating lever 64. The disk shaped operating plate 61 is disposed on the bottom of the interior of the casing member 53 so as to be allowed to rotationally move. The operating rod 62 is configured to rotationally move the operating plate 61. The toggle spring 63 is a torsion coil spring and urges the operating rod 62 to be switched between an operating position and a releasing position. The operating lever 64 is configured to perform a rotational movement operation of the operating rod 62.

The operating plate 61 is a ring shaped member, and the inner ring 55 is allowed to pass through the inner peripheral part of the operating plate 61. A cam receiving hole 61a is formed in the operating plate 61, and a cam protrusion 62a formed on the tip of the operating rod 62 is arranged to engage the cam receiving hole 61a. Also, a plurality of interlocking recessed portions 61b (e.g., six) are formed on the outer peripheral part of the operating plate 61 at equal intervals in the circumferential direction. The interlocking protrusions 57d formed on the rear end surface of the retainer 57 engage the interlocking recessed portions 61b. Therefore, when the operating plate 61 is rotationally moved, the retainer 57 is rotationally moved and it is possible to move the rollers 56 between the coupling position and the non-coupling position.

The operating rod 62 is rotationally and movably supported by the mechanism attachment portion 2e of the reel body 2a, and the above described cam protrusion 62a is formed to radially protrude on its tip. The tip of the operating rod 62 penetrates the passing hole 53d of the casing member 53 and is engaged with the cam receiving hole 61a. When the cam protrusion 62a rotationally moves, the cam receiving hole 61a is accordingly pressed and the operating plate 61 is rotationally moved.

One end of the toggle spring 63 is interlocked with the operating rod 62 and the other end is interlocked with the mechanism attachment portion 2e. The toggle spring 63 urges the operating rod 62 to be switched between the operating position and the releasing position.

The operating lever 64 is integral with and rotatably coupled to the rear end part of the operating rod 62 by means of a bolt member 65. As illustrated in FIGS. 1 and 2, the operating lever 64 is exposed to the outside from the bottom part of the reel unit 2.

The spool 4 is disposed between the first arm portion 31 and the second art portion 32 of the rotor 2 and is mounted to the tip of the spool shaft 20 through a drag mechanism 70. The spool 4 includes a bobbin trunk 4a around the periphery of which the fishing line is wound, a skirt portion 4b that is integrally formed on the rear part of the bobbin trunk 4a, and a flange portion 4c that is fixed to the front end of the bobbin trunk 4a. The flange portion 4c is integrally formed with the bobbin trunk 4a.

When casting, the bail 43 is flipped over to the line-releasing posture while the fishing line is hooked by the index finger. Accordingly, the first and second bail support members 40 and 42 rotationally move in the same direction.

When the fishing line is wound in, the bail 43 is flipped over to the line-winding posture. When the handle 1 is rotated in the line-winding direction while the state is maintained, the rotation force is transmitted to the pinion gear 12 through the handle shaft 10 and the master gear 11. The rotation force transmitted to the pinion gear 12 is transmitted to the rotor 3 through the front portion 12a of the pinion gear 12.

On the other hand, in accordance with rotation of the master gear 11, the intermediate gear part 22 is rotated by the first gear 22a that meshes with the driving gear 21, and the cam gear part 23 is rotated by the mesh between the second gear 22b and the gear part 23a, and the rotation is transmitted to the slider part 24 by the cam pin 23b. As a result, the slider part 24 is reciprocated back and forth along the axis X of the spool shaft 20.

Here, rotation velocity is reduced between the driving gear 21 and the first gear 22a and is also reduced between the second gear 22b and the gear part 23a. Thus, the rotational velocity of the handle 1 is greatly reduced; and accordingly, the rotational velocity of the cam gear part 23 will be further reduced than in the past. Therefore, reciprocal velocity of the spool 4 will be reduced, and this makes it possible to densely wind the fishing line around the spool 4. Also, the second gear 22b and the gear part 23a are non-circular gears. Therefore, it is possible to convert the uniform circular motion to non-uniform circular motion. Because of this, it is possible to further inhibit the disordered line-winding shape caused by the variation in the anteroposterior velocity of the spool 4 than a case in which a circular gear is used.

When casting or the like is performed, the rollers 56 are moved to the coupling position by the operating lever 64 so that the rotor 3 is not reversely rotated. In other words, by rotationally moving the operating lever 64 in one direction, the operating rod 62 is accordingly rotationally moved in the same direction. When the operating rod 62 is rotationally moved, the operating plate 61 is rotationally moved by the cam protrusion 62a of the operating rod 62, and the retainer 57 is also rotationally moved together with them. As a result, the rollers 56 held by the retainer 57 are moved in the coupling position.

When the rotor 3 (i.e., the inner ring 55) is rotated in a forward direction (clockwise line-winding direction in FIG. 5) while the state is maintained, the rollers 56 are moved from the position in which the rollers 56 frictionally engage the cam surface 54a by resisting the urging force applied by the spring members 58, and idle between the outer ring 54 and the inner ring 55. Therefore, the rotor 3 is not prevented from rotating in the forward direction. However, if the urging force applied by the spring members 58 is too strong, the rollers 56 are not easily moved away from the frictionally engaged position, and thus there is a possibility that rotation in the line-winding direction will not perform smoothly. However, according to the present invention, the spring members 58 are allowed to urge the rollers 56 with high dimensional accuracy in a direction that the rollers 56 frictionally engage the cam surfaces 54a. Therefore, there is no possibility that rotation in the line-winding direction will not perform smoothly.

On the other hand, when the rotor 3 (i.e., the inner ring 55) is rotated in the reverse direction (counterclockwise line-releasing direction in FIG. 5), the rollers 56 frictionally engage the outer ring 54 and the inner ring 55 while being interposed between the outer ring 54 and the inner ring 55, and thus the both are not allowed to rotate relative to each other. Therefore, the outer ring 54 is secured to the reel unit 2 through the casing member 53, and accordingly rotation of the inner ring 55, that is, rotation of the rotor 3 in one direction (direction in which the fishing line is reeled out) is prohibited.

When the operating lever 64 is rotationally moved in an opposite direction to the above described direction, the rollers 56 are moved to the non-coupling direction by a similar movement to the above described movement. In this state, the rollers 56 are not allowed to frictionally engage the outer ring 54 and the inner ring 55 while being interposed between the outer ring 54 and the inner ring 55. Therefore, the inner ring 55 is allowed to rotate in both forward and reverse directions with respect to the outer ring 54, and thus the rotor 3 will be allowed to rotate in the reeling-out direction of the fishing line.

Other Example Embodiments (a) In the above described embodiment, the inner ring idling type is exemplified. However, the present invention is not limited to the inner ring idling type. In a case of the outer ring idling type, a plurality of cam surfaces formed on the outer peripheral surface of an inner ring may be provided, and an attachment portion of a retainer may be disposed on the end surface of the inner ring. Also, a plurality of holding portions of the retainer may be formed on the outer peripheral part of the attachment portion of the retainer at predetermined intervals.

(b) In the above described embodiment, the roller clutch that is mounted to the spinning reel is exemplified. However, the present invention is not limited to this and is capable of being applied to a roller clutch of all types as a mechanical element.

(c) In the above described embodiment, the roller clutch is configured to switched between the operating state and the non-operating state. However, if it is not necessary to switch the roller clutch between the operating state and the non-operating state, the spring member and the retainer may be non-rotatably coupled to the casing member or the outer ring.

(d) In the above described embodiment, the roller clutch is provided with the casing member and the cover member. However, these members are not inevitable elements for the roller clutch. For example, when a component such as a reel unit is provided with a tubular portion and an outer ring is directly mounted on the component, the casing member is not needed. Also, a retaining spring, a sealing member, and the like may be used as a substitute element for the cover member.

(e) In the above described embodiment, the holding member 57b and the shaft portion 57c are integrally formed. However, they may be formed as separate elements.

The term "configured" as used herein to describe a component, section or part of a device includes hardware that is constructed to carry out the desired function.

Moreover, terms of degree such as "substantially", "more or less", and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A roller clutch configured to transmit rotation in only one direction, comprising:

an outer ring having an inner peripheral surface;

an inner ring having an outer peripheral surface, the inner ring being disposed on the inner peripheral side of the outer ring;

a plurality of rollers disposed between the inner ring and the outer ring at predetermined intervals in a circumferential direction, the plurality of rollers being allowed to frictionally engage the outer ring and the inner ring while being interposed there between;

a retainer having a plurality of holding portions, a plurality of shaft portions, and a washer plate-shaped attachment portion, the washer plate-shaped attachment portion being a flat ring shaped portion, the plurality of holding portions being disposed among the plurality of rollers, the plurality of shaft portions protruding from the plurality of holding portions toward the plurality of rollers, the holding portions protruding from an inner peripheral part of the attachment portion to a center of the attachment portion, the shaft portions being integrally formed with the holding portions;

a cam surface formed either on the outer peripheral surface or the inner peripheral surface, the cam surface having an oblique surface, the oblique surface being arranged to contact the outer peripheral surface of the roller; and a spring member disposed on outer peripheral side of each of the plurality of shaft portion, the spring member being configured to urge the plurality of rollers in a direction such that the plurality of rollers frictionally engage the cam surface.

2. The roller clutch according to claim 1, wherein the cam surface is disposed on the inner peripheral surface of the outer ring.

3. The roller clutch according to claim 1, further comprising a closed-end tubular casing member, the casing member being secured to a reel unit of a fishing reel, the casing member having, an interior space arranged to accommodate the outer ring and the retainer.

4. The roller clutch according to claim 1, wherein the attachment portion is mounted on an end surface of the outer ring.

5. The roller clutch according to claim 4, wherein the attachment portion is disposed between the outer ring and a bottom portion of the casing member.

6. The roller clutch according to claim 1, wherein each of the holding portions includes the shaft portion on one surface thereof in a circumferential direction and a curved contact surface on the other surface thereof, the contact surface being arranged to contact the outer peripheral surface of the rollers.

7. The roller clutch according to claim 1, wherein each of the shaft portions includes a protruding portion on a part of the outer peripheral surface thereof, the protruding portion being arranged to contact an inner peripheral part of the spring member.

8. The roller clutch according to claim 7, wherein each of the protruding portions protrudes in a direction substantially perpendicular to the direction in which the respective shaft portion protrudes.

9. The roller clutch according to one of claim 1, wherein each of the shaft portions includes a pair of cutout surfaces on the outer peripheral surface thereof, the pair of cutout surfaces being disposed substantially parallel to axes of the rollers, the pair of cutout surfaces being disposed parallel to each other.

10. A spinning reel, comprising:
a reel unit;
a spool;
a rotatable handle;
a rotor disposed forwardly of the reel unit, the rotor being rotatable in association with rotation of the handle; and
a roller clutch configured to transmit rotation to the rotor in only one direction, the roller clutch including
an outer ring having an inner peripheral surface,
an inner ring having an outer peripheral surface, the inner ring being disposed on the inner peripheral side of the outer ring,
a plurality of rollers disposed between the inner ring and the outer ring at predetermined intervals in a circumferential direction, the plurality of rollers being allowed to frictionally engage the outer ring and the inner ring while being interposed there between,
a retainer having a plurality of holding portions, a plurality of shaft portions, and a washer plate-shaped attachment portion, the washer plate-shaped attachment portion being a flat ring shaped portion, the plurality of holding portions being disposed among the plurality of rollers, the plurality of shaft portions protruding from the plurality of holding portions toward the plurality of rollers, the holding portions protruding from an inner peripheral part of the attachment portion to a center of the attachment portion, the shaft portions being integrally formed with the holding portions,
a cam surface formed either on the outer peripheral surface or the inner peripheral surface, the cam surface having an oblique surface, the oblique surface being arranged to contact the outer peripheral surface of the roller, and
a spring member disposed on an outer peripheral side of each of the plurality of shaft portion, the spring member being configured to urge the plurality of rollers in a direction such that the plurality of rollers frictionally engage the cam surface.

11. The spinning reel according to claim 10, wherein the cam surface is disposed on the inner peripheral surface of the outer ring.

12. The spinning reel according to claim 10, the roller clutch further including a closed-end tubular casing member, the casing member being secured to the reel unit, the casing member having an interior space arranged to accommodate the outer ring and the retainer.

13. The spinning reel according to claim 10, wherein the attachment portion is mounted on an end surface of the outer ring.

14. The spinning reel according to claim 13, wherein the attachment portion is disposed between the outer ring and a bottom portion of the casing member.

15. The spinning reel according to claim 10, wherein each of the holding portions includes the shaft portion on one surface thereof in a circumferential direction and a curved contact surface on the other surface thereof, the contact surface being arranged to contact the outer peripheral surface of the rollers.

16. The spinning reel according to claim 11, wherein the spring member is a coil spring, and each of the shaft portions includes a protruding portion on a part of the outer peripheral surface of the shaft portion, the protruding portion being arranged to contact an inner peripheral part of the coil spring.

17. The spinning reel according to claim 16, wherein each of the protruding portions protrudes in a direction substantially perpendicular to the direction in which the respective shaft portion protrudes.

18. The spinning reel according to claim 10, wherein each of the shaft portions includes a pair of cutout surfaces on the outer peripheral surface thereof, the pair of cutout surfaces being disposed substantially parallel to axes of the rollers, the pair of cutout surfaces being disposed parallel to each other.

* * * * *